United States Patent
Fang et al.

(10) Patent No.: US 8,894,405 B2
(45) Date of Patent: Nov. 25, 2014

(54) THREE-SIDE ADJUSTABLE SCRAPER OF EXTRUSION DEVICE

(75) Inventors: Zheng Fang, Wenzhou (CN);
Tongcheng Xu, Wenzhou (CN);
Zhendao Zhou, Wenzhou (CN)

(73) Assignee: Zhejiang Canaan Technology Limited, Wenzhou, Zhejiang (CN)

( * ) Notice: Subject to any disclaimer, the term of this patent is extended or adjusted under 35 U.S.C. 154(b) by 0 days.

(21) Appl. No.: 14/112,939

(22) PCT Filed: Dec. 26, 2011

(86) PCT No.: PCT/CN2011/084646
§ 371 (c)(1),
(2), (4) Date: Oct. 21, 2013

(87) PCT Pub. No.: WO2012/152027
PCT Pub. Date: Nov. 15, 2012

(65) Prior Publication Data
US 2014/0059795 A1    Mar. 6, 2014

(30) Foreign Application Priority Data

May 11, 2011    (CN) .......................... 2011 1 0121217

(51) Int. Cl.
*B29C 47/08*    (2006.01)
*B30B 15/08*    (2006.01)
*B30B 11/22*    (2006.01)
*B30B 11/28*    (2006.01)

(52) U.S. Cl.
CPC ............. *B29C 47/0883* (2013.01); *B30B 15/08* (2013.01); *B30B 11/22* (2013.01); *B30B 11/28* (2013.01); *B30B 11/227* (2013.01)
USPC ........... 425/225; 425/190; 425/230; 425/232; 425/215; 425/218; 15/256.5; 15/256.51

(58) Field of Classification Search
CPC ............................ B30B 15/08; B29C 47/0877
USPC .......... 425/215, 218, 190, 225–232, DIG. 46; 15/256.5, 256.51
See application file for complete search history.

(56) References Cited

U.S. PATENT DOCUMENTS

| | | | | | |
|---|---|---|---|---|---|
| 1,650,758 | A | * | 11/1927 | Kukla | 425/230 |
| 1,797,291 | A | * | 3/1931 | Kutter | 100/174 |
| 1,831,531 | A | * | 11/1931 | Harber | 425/168 |
| 2,131,606 | A | * | 9/1938 | Von Hofe | 118/262 |
| 2,595,070 | A | * | 4/1952 | Garrahan | 101/350.6 |

(Continued)

*Primary Examiner* — Joseph S Del Sole
*Assistant Examiner* — Nahida Sultana

(57) ABSTRACT

A three-side adjustable scraper of an extrusion device includes a scraper body arranged on the body of an extrusion device. One side of the scraper body has a knife edge which is attached to the wheel surface of an extrusion wheel of the extrusion device, and the scraper body is adjustably provided with a left side scraper seat and a right side scraper seat. A left side scraper and a right side scraper are respectively arranged on the left side scraper seat and the right side scraper seat, and the knife edges of the left side scraper and the right side scraper are respectively attached to the two sides of the extrusion wheel of the extrusion device. The left side scraper and the right side scraper are additionally arranged, so that materials adhered on the two sides of the extrusion wheel can be scraped off by the scraper.

2 Claims, 5 Drawing Sheets

(56) References Cited

U.S. PATENT DOCUMENTS

| | | | |
|---|---|---|---|
| 2,965,926 A * | 12/1960 | Von Haase | 425/382 R |
| 3,061,867 A * | 11/1962 | Hill | 15/256.51 |
| 3,471,602 A * | 10/1969 | Patton et al. | 419/69 |
| 4,263,869 A * | 4/1981 | Wahnschaff | 118/249 |
| 4,285,090 A * | 8/1981 | Jurkowski | 15/256.51 |
| 4,944,386 A * | 7/1990 | Swinderman | 198/499 |
| 5,880,755 A * | 3/1999 | Fajour et al. | 347/33 |
| 6,539,195 B2 * | 3/2003 | Sakaba et al. | 399/326 |

* cited by examiner

THREE-SIDE ADJUSTABLE SCRAPER OF EXTRUSION DEVICE

BACKGROUND OF THE INVENTION

1. Field of the Invention

The present invention relates to a scraper used for an extrusion wheel, and more particularly to a three-side adjustable scraper.

2. Description of the Prior Art

An extrusion device comprises an extrusion wheel driven by a motor. The material is fed into the extrusion device and then extruded by the extrusion wheel to form a desired shape. During extrusion, the material may overflow to adhere on the wheel surface of the extrusion wheel as well as the left and right sides of the extrusion wheel. Therefore, the extrusion wheel is provided with a scraper to scrape off the material adhered on the wheel surface of the extrusion wheel. This scraper is unable to scrape off the material adhered on the left and right sides of the extrusion wheel so the material cannot be scraped fully, resulting in a bad extruding quality of the products, a waste of the material and an influence on the work efficiency of the extrusion wheel.

Accordingly, the inventor of the present invention has devoted himself based on his many years of practical experiences to solve these problems.

SUMMARY OF THE INVENTION

The primary object of the present invention is to provide a three-side adjustable scraper of an extrusion device to scrape off the materials adhered on an extrusion wheel in all directions.

In order to achieve the aforesaid object, the present invention comprises a scraper body arranged on the body of the extrusion device. One side of the scraper body has a knife edge. The knife edge is attached to the wheel surface of an extrusion wheel of the extrusion device. The scraper body comprises a left side scraper seat and a right side scraper seat thereon. The left side scraper seat and the right side scraper seat are adjustably disposed on the scraper body. The left side scraper seat has a left side scraper thereon. The right side scraper seat has a right side scraper thereon. The knife edges of the left side scraper and the right side scraper are respectively attached to two sides of the extrusion wheel of the extrusion device.

Preferably, the left side scraper seat and the right side scraper seat are disposed on the scraper body through bolts. The left side scraper seat and the right side scraper seat each have a plurality of adjustment holes. The scraper body has bolt holes corresponding to the adjustment holes. The bolt holes have a diameter smaller than that of the adjustment holes. The bolts are inserted through the adjustment holes and cooperate with the bolt holes so that the left side scraper seat and the right side scraper seat are adjustable. Before installation, the left side scraper and the right side scraper are respectively attached to the two sides of the extrusion wheel by moving the scraper seats on the scraper body so that the scraper can scrape off the materials fully to enhance the scraping effect so as to ensure the quality of the products.

Preferably, the scraper body comprises a front shaft and a rear shaft therein. The front shaft and the rear shaft are parallel to each other. An adjustment sleeve is provided between the rear shaft and the scraper body. Before installation, by adjusting the adjustment sleeve and the rear shaft, the engagement of the scraper body and the extrusion wheel is adjustable, so that the scraper can scrape off the materials adhered on the wheel surface of the extrusion wheel fully.

Preferably, the front shaft and the rear shaft are fixed to the scraper body through nuts, such that the front shaft and the rear shaft cooperate with the scraper body more stably.

Preferably, the left side scraper and the right side scraper are perpendicular to the scraper body. The knife edge of the right side scraper, the knife edge of the left side scraper and the knife edge of the scraper body form a U shape, such that the scraper of the present invention can scrape against the extrusion wheel in all directions to scrape off the materials fully.

Based on the scraper, the three-side adjustable scraper of the extrusion device of the present invention is additionally provided with the left side scraper and the right side scraper, so that materials adhered on the two sides of the extrusion wheel can be scraped off by the scraper fully.

DETAILED DESCRIPTION OF THE PREFERRED EMBODIMENTS

Figure 1:
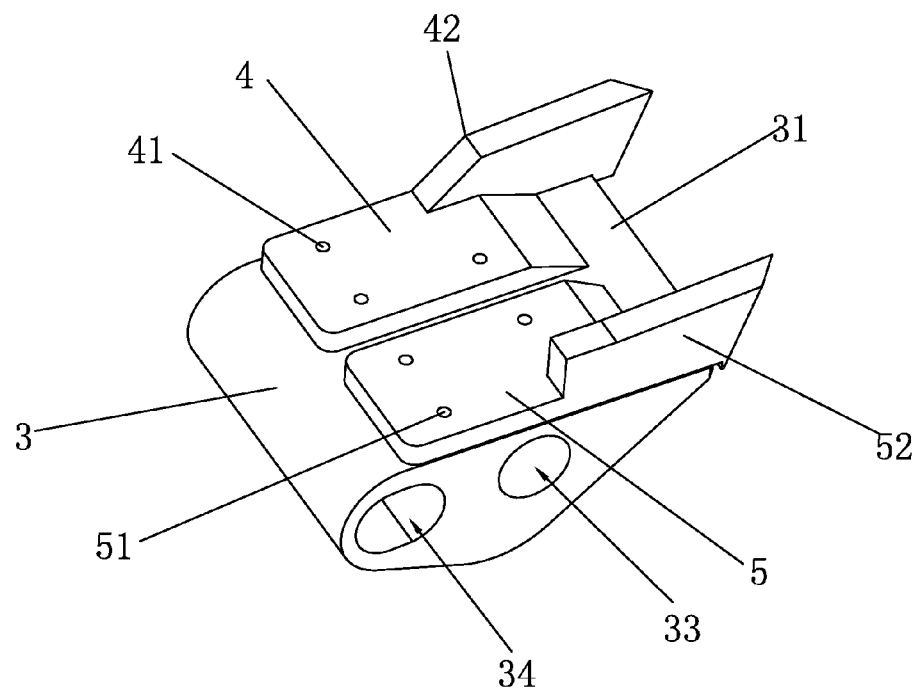
FIG. 1 is a perspective view according to a preferred embodiment of the present invention.

Embodiments of the present invention will now be described, by way of example only, with reference to the accompanying drawings.

As shown in FIG. 1 to FIG. 8, the present invention discloses a three-side adjustable scraper of an extrusion device. The present invention comprises a scraper body 3 arranged on the body of an extrusion device 1. One side of the scraper body 3 has a knife edge 31. The knife edge is attached to the wheel surface of an extrusion wheel 2 of the extrusion device 1. The scraper body 3 comprises a left side scraper seat 4 and a right side scraper seat 5 thereon. The left side scraper seat 4 and the right side scraper seat 5 are disposed on the scraper body 3 through bolts. The left side scraper seat 4 and the right side scraper seat 5 each have three adjustment holes 41, 51. The scraper body 3 has bolt holes 32 corresponding to the adjustment holes 41, 51. The scraper body 3 has six bolt holes 32. The bolt holes 32 have a diameter smaller than that of the adjustment holes 41. The bolts are inserted through the adjustment holes 41 and cooperate with the bolt holes 32 to form an adjustment configuration. The left three bolt holes 32 cooperate with the three adjustment holes 41 of the left side scraper seat 4. The right three bolt holes 32 cooperate with the three adjustment holes 51 of the right side scraper seat 5. The left side scraper seat 4 has a left side scraper 42 thereon, and the right side scraper seat 5 has a right side scraper 52 thereon. The knife edges of the left side scraper 42 and the right side scraper 52 are attached to two sides of the extrusion wheel 2 of the extrusion device 1, respectively. The left side scraper 42 and the right side scraper 52 of the present invention are perpendicular to the scraper body 3. The knife edge of the right side scraper 52, the knife edge of the left side scraper 42 and the knife edge 31 of the scraper body 3 form a U-shaped knife edge.

As shown in FIG. 2, FIG. 5, FIG. 6 and FIG. 7, the scraper body 3 comprises a front shaft 6 and a rear shaft 7 therein. The front shaft 6 and the rear shaft 7 are inserted through the main body 3. The scraper body 3 has a front shaft hole 33 and a rear shaft hole 34 for insertion of the front shaft 6 and the rear shaft 7. The front shaft 6 and the rear shaft 7 are parallel to each other. An adjustment sleeve 8 is provided between the rear shaft 7 and the scraper body 3.

Figure 2:
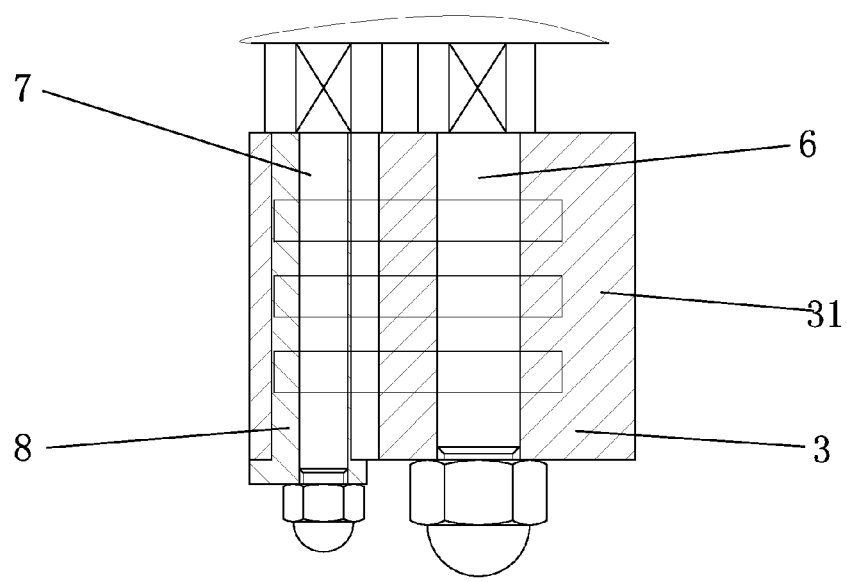
FIG. 2 is a sectional view showing the front shaft and the rear shaft according to the preferred embodiment of the present invention before installation.
Figure 3:
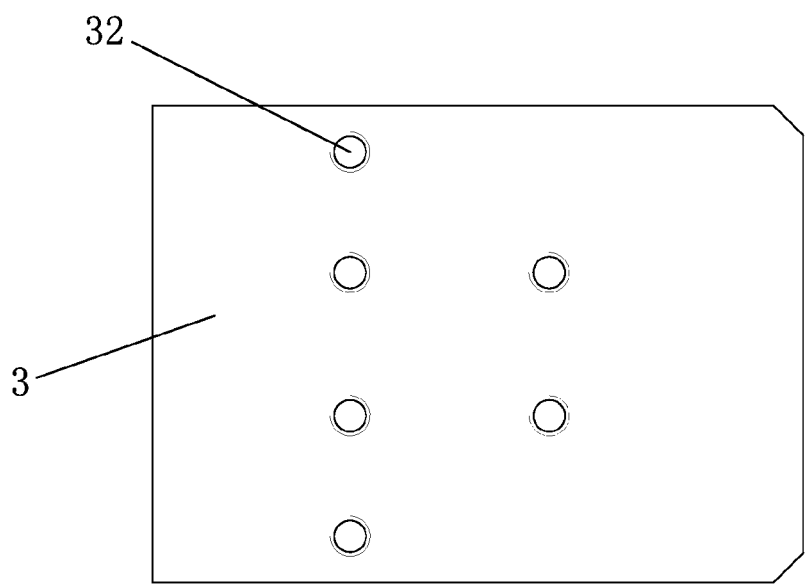
FIG. 3 is a schematic view showing the scraper body according to the preferred embodiment of the present invention.
Figure 4:
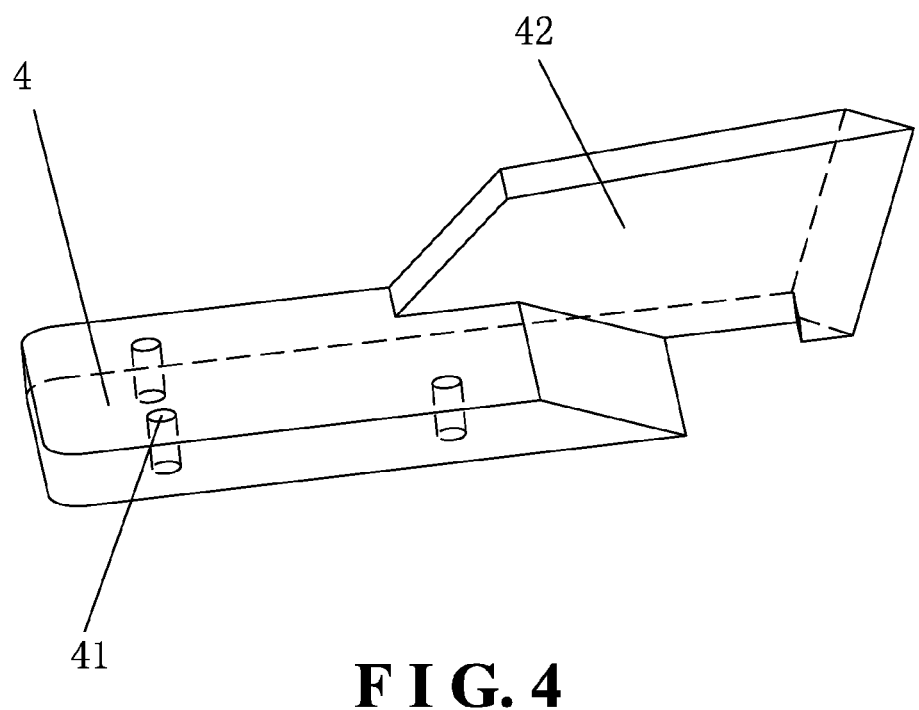
FIG. 4 is a schematic view showing the left side scraper seat and the left side scraper according to the preferred embodiment of the present invention.
Figure 5:
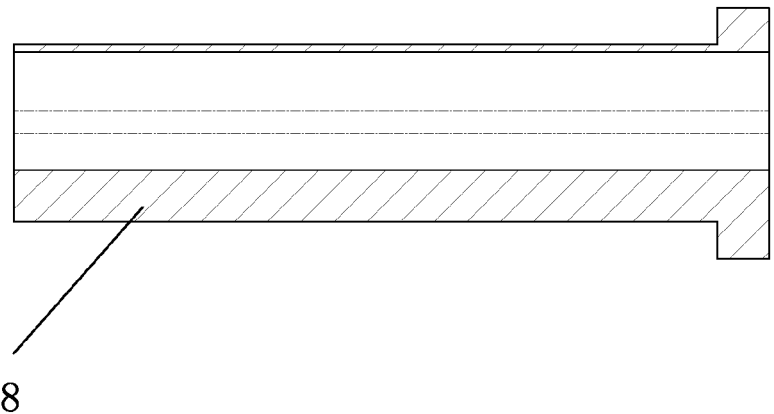
FIG. 5 is a schematic view showing the adjustment sleeve according to the preferred embodiment of the present invention.
Figure 6:
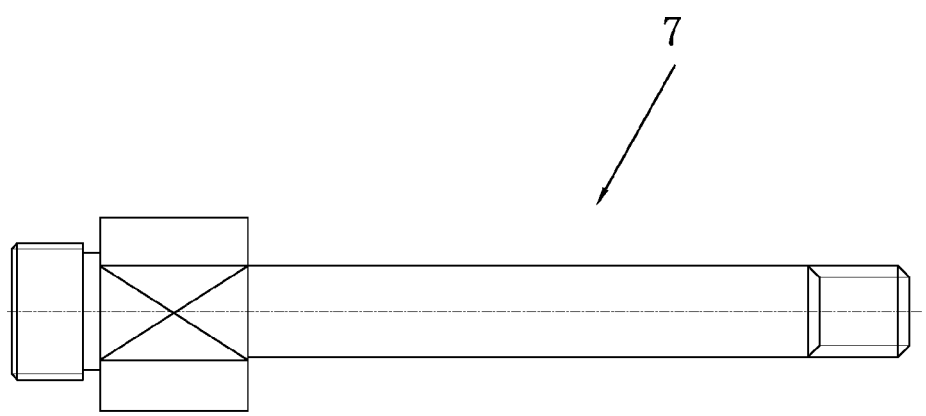
FIG. 6 is a schematic view showing the rear shaft according to the preferred embodiment of the present invention.
Figure 7:
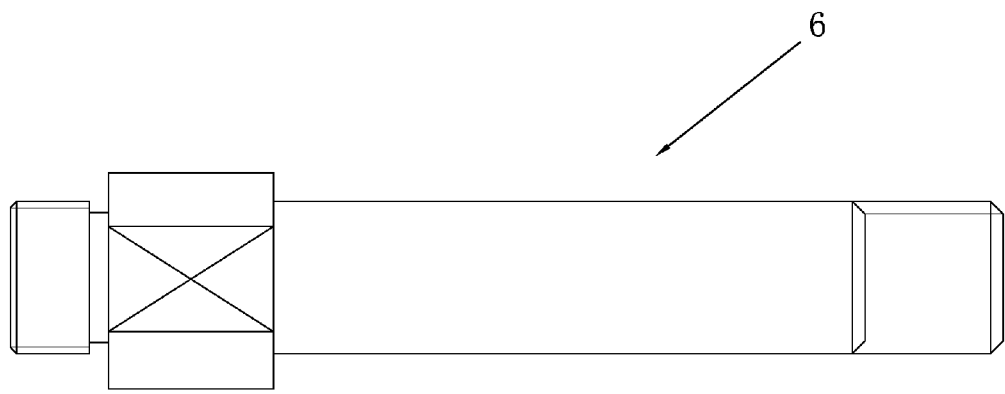
FIG. 7 is a schematic view showing the front shaft according to the preferred embodiment of the present invention.
Figure 8:
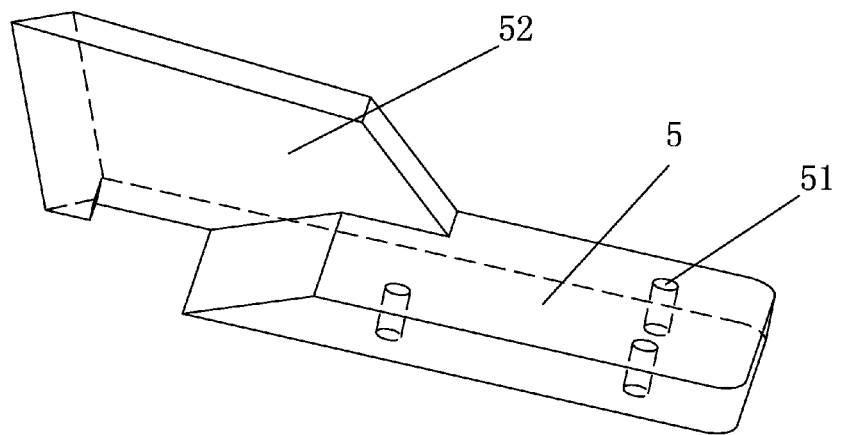
FIG. 8 is a schematic view showing the right side scraper seat and the right side scraper according to the preferred embodiment of the present invention.

As shown in FIG. 2, the front shaft 6 and the rear shaft 7 of the present invention are fixed to the scraper body 3 through nuts.

Figure 9:
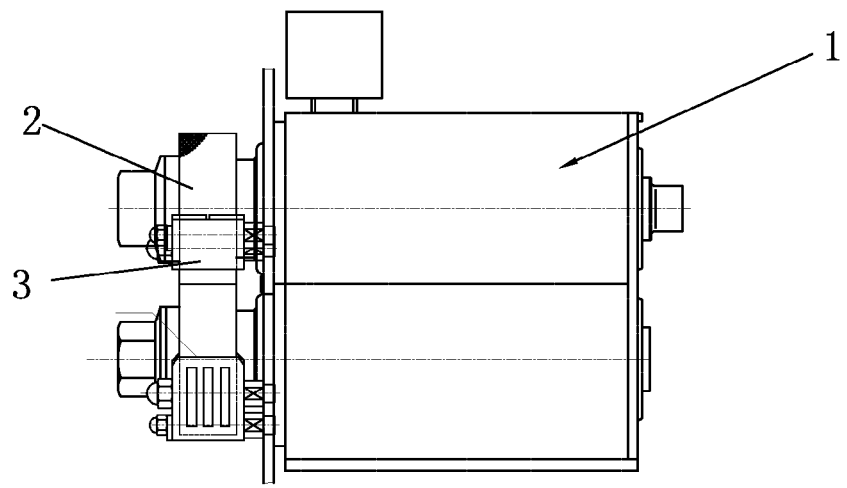
FIG. 9 is a side schematic view showing the scraper of the preferred embodiment of the present invention installed on the extrusion wheel.
Figure 10:
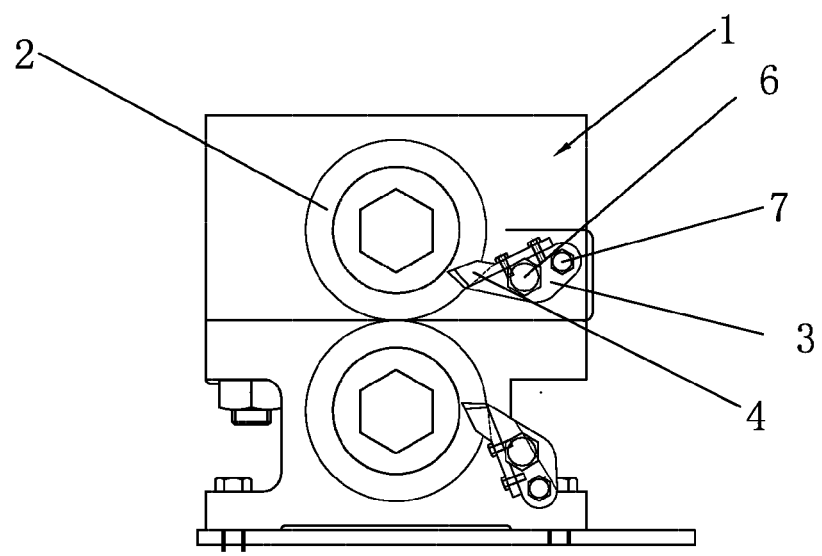
FIG. 10 is a front schematic view showing the scraper of the preferred embodiment of the present invention installed on the extrusion wheel.

As shown in FIG. 9 and FIG. 10, the three-side adjustable scraper of the extrusion device of the present invention is installed to cooperate with the extrusion wheel 2. The front shaft 6 of the present invention is fixed to the body of the extrusion device 1. When installed, the knife edge of the scraper body 3 is aligned with the wheel surface of the extrusion wheel 2, and then the adjustment sleeve 8 is adjusted for the knife edge of the scraper body 3 to be attached to the wheel surface of the extrusion wheel 2. The nut at the rear shaft 7 is tightened. After that, the left side scraper seat 4 and the right side scraper seat 5 are installed on the scraper body 3 through the bolts. The positions of the left side scraper seat 4 and the right side scraper seat 5 are adjusted for the left side scraper 42 and the right side scraper 52 to be attached to the two sides of the extrusion wheel 2, respectively. Then, the bolts on the left side scraper seat 4 and the right side scraper seat 5 are tightened so that the left side scraper seat 4 and the right side scraper seat 5 are installed on the scraper body 3.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A three-side adjustable scraper of an extrusion device, comprising a scraper body arranged on a body of the extrusion device, one side of the scraper body having a knife edge, the knife edge being attached to a wheel surface of an extrusion wheel of the extrusion device, the scraper body comprising a left side scraper seat and a right side scraper seat thereon, the left side scraper seat and the right side scraper seat being adjustably disposed on the scraper body, the left side scraper seat having a left side scraper thereon, the right side scraper seat having a right side scraper thereon, knife edges of the left side scraper and the right side scraper being respectively attached to two sides of the extrusion wheel of the extrusion device, wherein the scraper body comprises a front shaft and a rear shaft therein, the front shaft and the rear shaft being parallel to each other, an adjustment sleeve being provided between the rear shaft and the scraper body.

2. The three-side adjustable scraper of an extrusion device as claimed in claim 1, wherein the front shaft and the rear shaft are fixed to the scraper body through nuts.

\* \* \* \* \*